April 20, 1965

M. J. DUER 3,179,426

HIGH TEMPERATURE ACTUATOR SEAL

Filed June 25, 1962

INVENTOR.
Morris J. Duer
BY
W.E. Finken
HIS ATTORNEY

3,179,426
HIGH TEMPERATURE ACTUATOR SEAL

Morris J. Duer, Indianapolis, Ind., assignor to General Motors Corporation, Detroit, Mich., a corporation of Delaware
Filed June 25, 1962, Ser. No. 204,901
5 Claims. (Cl. 277—112)

This invention pertains to piston rod packings, and particularly to a piston rod packing suitable for use in a high ambient temperature environment.

Heretofore, the piston rod packing used in high temperature actuators of the type shown in Geyer Patents 2,955,574 and 2,971,496 comprised a plurality of rings, assembled as a pack, and thereafter compacted between the stuffing box, or cylinder, and a beveled ring, or gland, with pressures up to 5000 p.s.i. being cyclically applied to effect the compaction. After compaction, the packing is held in assembled relation by a plurality of spring washers and a packing nut. The present invention relates to a high temperature packing which does not require the heretofore necessary compaction procedure thus greatly simplifying the packing installation, and yet provides a satisfactory seal at ambient temperatures up to 550° F. at a pressure of 150 p.s.i.

Accordingly, among my objects are the provision of an improved piston rod packing designed for a high temperature environment; the further provision of a piston rod packing comprising alternate frusto conical packing rings and spring washers; and the still further provision of a piston rod packing wherein the angularity of the spring washers differs from that of the packing rings.

The aforementioned and other objects are accomplished in the present invention by assembling a Belleville spring washer on both sides of each packing ring and compressing the assembly to obtain the requisite seal between the piston rod and the stuffing box. Specifically, in the disclosed embodiment, four Belleville spring washers and three packing rings are used in the assembly, both the packing rings and the Belleville washers being of frusto conical shape, but of different angularity. The packing is assembled between a beveled ring, or gland, and the stuffing box by means of a packing nut such that upon compression of the rings and the spring washers, the spring washers apply loads to the packing rings which maintain the packing rings in sealing engagement with the piston rod and the stuffing box.

Further objects and advantages of the present invention will be apparent from the following description, reference being had to the accompanying drawing, wherein a preferred embodiment of the present invention is clearly shown.

Figure 1:
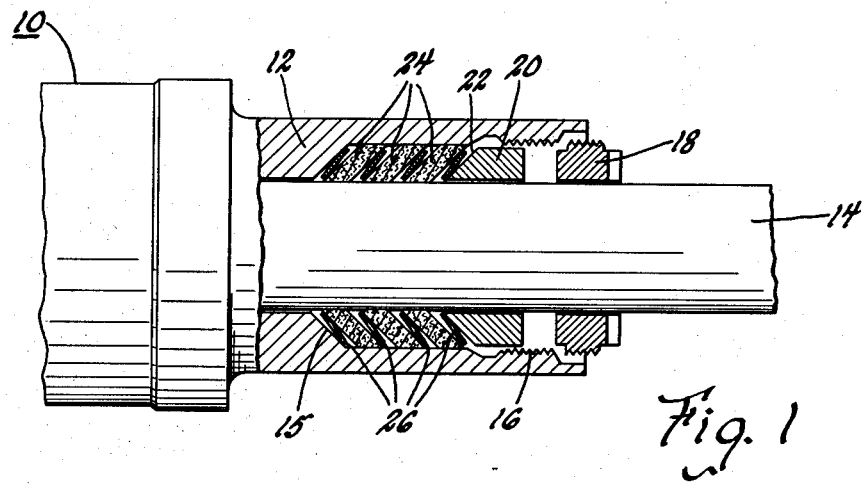
FIGURE 1 is a fragmentary view, partly in section and partly in elevation, of the improved high temperature piston rod packing prior to compression.
Figure 2:
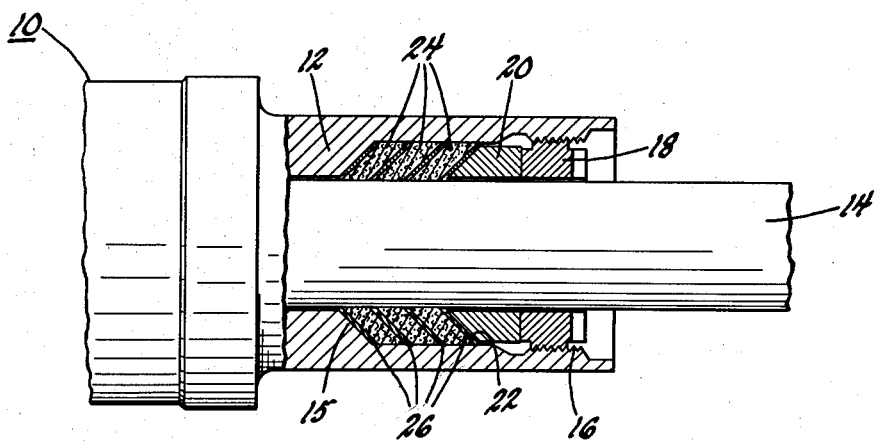
FIGURE 2 is a fragmentary view, partly in section and partly in elevation, of the improved high temperature piston rod packing after compression.

As shown in the drawing, the improved high temperature piston rod packing is shown in combination with an actuator cylinder 10 having a stuffing box 12 at the rod end thereof for receiving a reciprocable piston rod 14 which extends therethrough. The stuffing box 12 is formed with a beveled shoulder 15 which makes an angle of substantially 45° with the rod bore therethrough. The outer end of the stuffing box 12 is interiorly threaded at 16 for receiving a packing nut 18. The packing nut is engageable wtih a ring, or gland, 20, the front edge 22 of which is likewise beveled at an angle of 45° to the bore through the stuffing box. The piston rod seal, or packing, comprises three frusto conical, rings 24 of graphite impregnated asbestos, and four Belleville spring washers 26.

As seen in FIGURE 1, the frusto conical Belleville spring washers 26 are of different angularity than the packing rings 24. The spring washers are made of thin sheet metal, and hence are deformable under pressure. More particularly, the included angle between the Belleville spring washers 26 and the piston rod 14 is greater than the included angle between the packing rings 24 and the piston rod 14. Stated another way, the spring washers 26 are of flatter cross-section than the packing rings 24 prior to compression. Moreover, each packing ring 24 has a Belleville spring washer 26 on each side thereof so that the front Belleville spring washer engages the beveled shoulder 15 of the stuffing box 12 and the rear Belleville spring washer engages the beveled edge 22 of the gland 20.

The packing is installed by simply tightening the packing nut 18 to compress the Belleville spring washers 26 and the packing rings 24 disposed therebetween. As the packing nut 18 is tightened thereby moving the gland 20 inwardly towards the beveled shoulder 15 of the stuffing box, the frusto conical Belleville spring washers 26 are deformed to assume the angularity of the packing rings 24, the beveled shoulder 14 and the beveled edge 22 of the gland 20. Since the Belleville spring washers 26 are deformed by assembly of the nut 18, the inner and outer peripherel edges thereof urge the packing rings inwardly and outwardly, respectively, into resilient sealing engagement with the stuffing box 12 and the piston rod 14. Thus, the inner periphery of all except one Belleville washer urges the inner periphery of its adjacent packing ring into sealing engagement with the rod 14, and the outer periphery of all except one Belleville spring washer urges the outer periphery of the adjacent packing ring into sealing engagement with the stuffing box 12.

While the embodiment of the invention as herein disclosed constitutes a preferred form, it is to be understood that other forms might be adopted.

What is claimed is as follows:

1. A packing to be positioned in a stuffing box around a rod and to be compressed by a gland comprising, alternate spring washers and packing rings interposed between said spring washers, said spring washers being of thin sheet metal of frusto conical deformable cross-section and said packing rings being of frusto conical cross-section but of different angularity than said spring washers whereby compression of said packing by said gland will result in deformation of said spring washers so that said spring washers resiliently urge said packing rings into sealing contact with said stuffing box and said rod, said packing being characterized in that the inner peripheries of all except one of said spring washers urge the inner peripheries of their adjacent packing rings into sealing engagement with the rod and the outer peripheries of all except one of said spring washers urge the outer peripheries of their adjacent packing rings into sealing engagement wtih said stuffing box.

2. A packing to seal about a rod within a stuffing box subject to high ambient temperatures including, a plurality of spring washers of frusto conical cross-section, a plurality of frusto conical packing rings interposed between said spring washers, said spring washers and said packing rings being of different angularity, a gland within said stuffing box, and a packing nut engageable with said gland to compress the assembly of spring washers and packing rings by deforming said spring washers whereby said spring washers resiliently urge said packing rings into sealing engagement with the stuffing box and said rod, said packing being characterized in that the inner peripheries of all except one of said spring washers urge the inner peripheries of their adjacent packing rings into sealing engagement with the rod and the outer peripheries of all except one of said spring washers urge the outer peripheries of their adjacent packing rings into sealing engagement with said stuffing box.

3. A high temperature packing to be positioned in a stuffing box around a rod and to be compressed by a gland comprising, alternate spring washers and packing rings interposed between said spring washers, said spring washers being of thin sheet metal of frusto conical deformable cross-section and said packing rings being of graphite impregnated asbestos of frusto conical cross-section but of different angularity than said spring washers whereby compression of said packing by said gland will result in deformation of said spring washers so that said spring washers resiliently urge said packing rings into sealing engagement with said stuffing box and said rod, said packing being characterized in that the inner peripheries of all except one of said spring washers urge the inner peripheries of their adjacent packing rings into sealing engagement with the rod and the outer peripheries of all except one of said spring washers urge the outer peripheries of their adjacent packing rings into sealing engagement with said stuffing box.

4. A high temperature packing to be positioned in a stuffing box around a rod and to be compressed by a gland comprising, alternate spring washers and packing rings, the number of spring washers exceeding the number of packing rings by one, said spring washers being of thin sheet metal of frusto conical deformable cross-section and said packing rings being of graphite impregnated asbestos of frusto conical cross-section but of different angularity than said spring washers whereby compression of said packing by said gland will result in deformation of said spring washers so that said spring washers will resiliently urge said packing rings into sealing engagement with said stuffing box and said rod, said packing being characterized in that the inner peripheries of all except one of said spring washers urge the inner peripheries of their adjacent packing rings into sealing engagement with the rod and the outer peripheries of all except one of said spring washers urge the outer peripheries of their adjacent packing rings into sealing engagement with said stuffing box.

5. A packing to seal about a rod within a stuffing box subject to high ambient temperatures including, a plurality of spring washers of frusto conical cross-section, a plurality of frusto conical packing rings interposed between said spring washers, said spring washers and said packing rings being of different angularity with the spring washers being flatter than said packing rings, a gland within said stuffing box, and a packing nut engageable with said gland to compress the assembly of spring washers and packing rings by deforming said spring washers whereby said spring washers resiliently urge said packing rings into sealing engagement with said stuffing box and said rod, said packing being characterized in that the inner peripheries of all except one of said spring washers urge the inner peripheries of their adjacent packing rings into sealing engagement with the rod and the outer peripheries of all except one of said spring washers urge the outer peripheries of their adjacent packing rings into sealing engagement with said stuffing box.

References Cited by the Examiner

UNITED STATES PATENTS

| 1,901,606 | 3/33 | Marsh | 277—48 |
| 1,969,008 | 8/34 | Hubbard | 277—48 |
| 2,151,356 | 3/39 | Queen | 277—124 |
| 2,646,959 | 7/53 | Carver | 277—117 X |

FOREIGN PATENTS

| 559,736 | 3/44 | Great Britain. |

LEWIS J. LENNY, *Primary Examiner.*
SAMUEL ROTHBERG, *Examiner.*